No. 886,372. PATENTED MAY 5, 1908.
A. S. HUBBARD.
ELECTRICAL SYSTEM OF DISTRIBUTION.
APPLICATION FILED APR. 15, 1905.
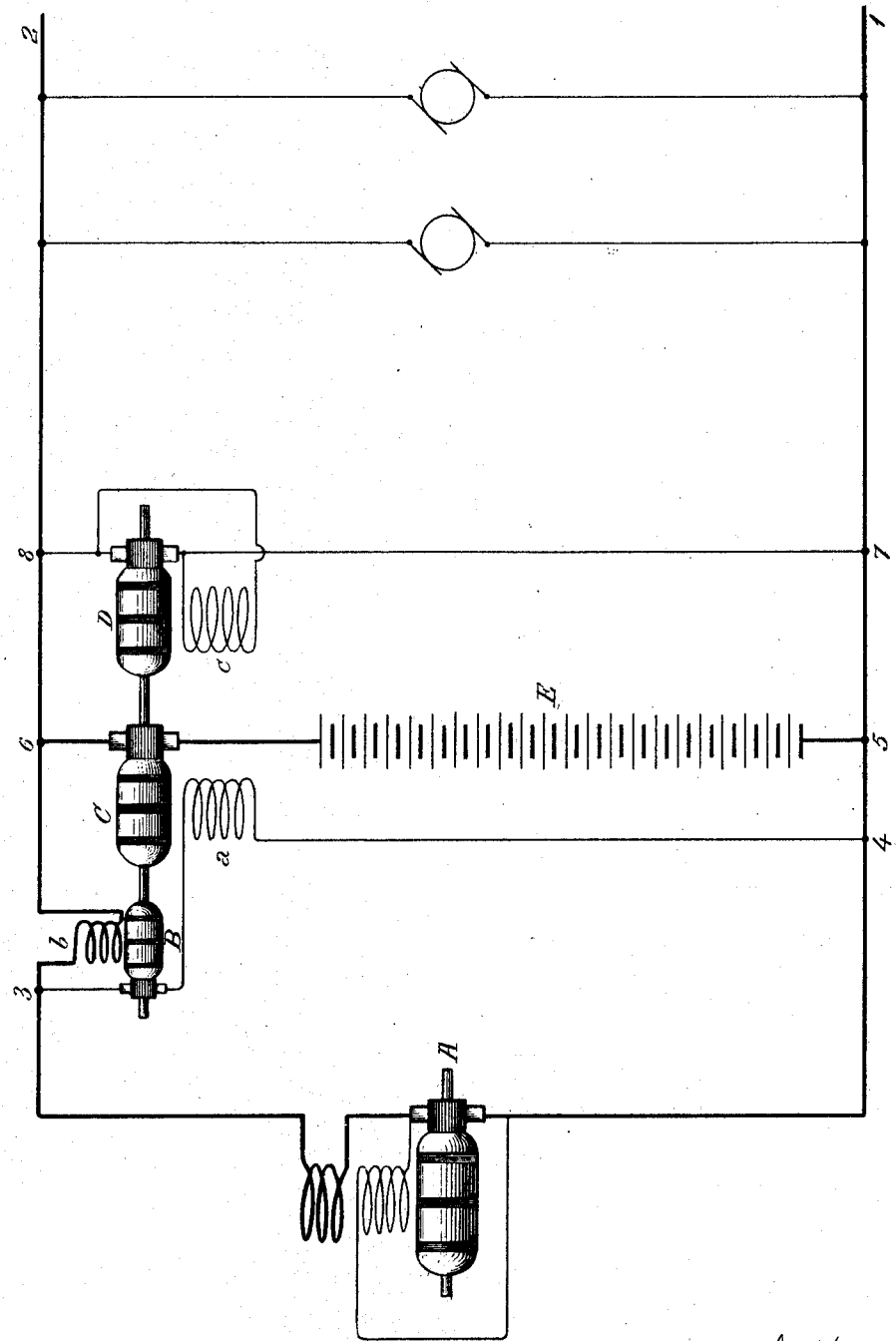

UNITED STATES PATENT OFFICE.

ALBERT S. HUBBARD, OF GREENWICH, CONNECTICUT, ASSIGNOR TO GOULD STORAGE BATTERY COMPANY, A CORPORATION OF NEW YORK.

ELECTRICAL SYSTEM OF DISTRIBUTION.

No. 886,372.      Specification of Letters Patent.      Patented May 5, 1908.

Application filed April 15, 1905. Serial No. 255,728.

*To all whom it may concern:*

Be it known that I, ALBERT S. HUBBARD, a citizen of the United States, residing in Greenwich, in the county of Fairfield and State of Connecticut, have invented certain new and useful Improvements in Electrical Systems of Distribution, of which the following is a specification.

My invention relates to electrical systems of distribution employing a battery and booster connected in series with each other and in parallel with a main generator or group of generators.

In order to make the branch containing the battery and booster afford the best possible compensatory effect upon the generator of the system, it has been usual to provide means for automatically varying the booster voltage. In prior patents issued to me, I have shown apparatus whereby the booster voltage is varied in accordance with the fluctuations of current in the generator branch of the circuit.

It is the object of the present invention to provide an improved arrangement of regulating apparatus that will act to maintain the load on the main generator much more constant than it has been hitherto possible to maintain it and yet vary the primary regulation by means of fluctuations in the generator branch of the circuit. By my invention, I propose to utilize fluctuations in the generator branch of the circuit and yet compensate for these very fluctuations, so that they will not fall on the generator itself. Theoretically, this may be carried so far that the generator may be maintained at absolute constancy. To this end, I so arrange the regulating apparatus that when a change in the system tends to cause a change of current on the generator, and does in fact cause a change of current in the regulating coil located in the generator circuit, the regulating apparatus itself serves to transfer power from one side of said regulating coil to the other, so as to offset wholly or in part the change that would otherwise fall on the generator. The regulating apparatus has then a certain transforming action which tranfers current from the working circuit to the generator circuit or vice versa, one end of the regulating apparatus being connected to the system in the working circuit or beyond the regulating coil and the other end of the regulating apparatus being connected to the generator circuit between the generator and the coil that affords the primary source of regulation for the booster.

The drawing accompanying this specification is a diagram illustrating one specific embodiment of my invention.

In this drawing, A is a main generator; E is a storage battery and C the armature of a booster. The battery and booster armature are connected in series in a branch, which is connected at points 5 and 6 with conductors connected to the generator A.

D is a motor which may have a shunt field $c$ and is connected in shunt at points 7 and 8 to the conductors 1 and 2 of the working circuit in which are translating devices T. This motor is connected mechanically with the booster C and affords a means for rotating said booster at substantially constant speed.

$a$ is the field coil of the booster. This coil is in series with a small dynamo B, the two being connected in shunt to the generator circuit at points 3, 4. The voltage of the small dynamo B is governed by the intensity of current in the coil $b$ which is connected as a field coil for such machine. This field coil is placed in the generator circuit, that is, between the generator and the point 6, where the battery branch is connected so that it would, if it were not for the action of the regulating apparatus which I will describe, have the same current as the generator A.

The dynamo B has formerly been known in the art as a counter electromotive force machine. Its voltage is opposed to that of the generator, so that the current in the booster field $a$, and therefore the voltage in the booster, is dependent upon the relation between the voltage of dynamo B and generator A. In practice, the coil $b$ at a given intensity of current will produce a condition in which the battery circuit neither gives out nor receives current. A greater intensity in coil $b$ causes the battery to give out current to the working circuit, while a less intensity in the coil $b$ causes the battery to receive current from the generator.

To fully appreciate the operation of the invention, I will illustrate by assuming a preferred condition of operation, although I desire it to be understood that the arrangement described may be designed to operate under radically different conditions without altering the essential operation of the invention. Assume that for a given intensity of current in coil $b$, the booster C gives no voltage and no current is flowing in the battery circuit. Assume that the parts are so adjusted that for a 5 per cent. increase in the coil $b$ the booster will be giving its maximum voltage in a direction that will add to the battery discharge, while on a drop of 5 per cent. in the intensity of the current in the coil $b$ the booster will give its maximum voltage in a direction that will assist a charge of the battery. Under these circumstances, the booster is always acting as a generator and the motor D is always acting as a motor; but the small machine B is sometimes a motor and sometimes a generator, its voltage, when the intensity in the coil $b$ is high, being necessarily higher than the voltage of the generator, while its voltage is necessarily lower than that of the generator when the intensity in the coil $b$ is low. It will be noted, therefore, that the dynamo B is necessarily delivering current to the generator circuit when the current in coil $b$ of that circuit has increased and is receiving current from the generator circuit when the current in $b$ has decreased.

It will thus be seen that while the current in that part of the generator circuit in which coil $b$ is located has varied from 5 per cent. above and 5 per cent. below a certain normal, the current of the generator itself has not varied accordingly, because the regulating apparatus has acted to transfer current from the working circuit to the generator circuit to offset this change. The manner in which this has been transferred is obvious. Under the conditions chosen for illustration, the motor D will be assisted by the machine B at times of low current in coil $b$, whereas, the motor D will have to drive both the booster and the machine B at times of high current in coil $b$.

To attain the best results from my invention, the regulating apparatus should be so designed that the current transferred from one circuit to the other shall be practically equal to the changes of current that are permitted to fall upon the regulating coil $b$. In the present instance this may be accomplished by suitable design of the resistance and ampere-turns of the field coil $a$.

Having thus described my invention, what I claim, and desire to protect by Letters Patent, is:

1. The combination with a working circuit of a main generator and compensatory circuit in parallel to each other with relation to the working circuit, a regulating coil for such compensatory circuit located in the generator circuit, and a second compensatory circuit connected to the generator circuit between the regulating coil and the generator.

2. The combination with a working circuit of a main generator and compensatory circuit in parallel to each other with relation to the working circuit, a regulating coil for such compensatory circuit located in the generator circuit, a second compensatory circuit at one side of said coil, a circuit at the other side of said coil, and means for transferring energy from one of said last two circuits to the other.

3. The combination with a working circuit of a main generator and compensatory circuit in parallel to each other with relation to the working circuit, a regulating coil for such compensatory circuit located in the generator circuit, and a second compensatory circuit for said generator controlled by said regulating coil to offset changes of current in the regulating coil.

4. The combination with a working circuit of a main generator and compensatory circuit in parallel to each other with relation to the working circuit, a regulating coil for such compensatory circuit located in the generator circuit, a second compensatory circuit for said generator controlled by said regulating coil, a circuit at the other side of said coil, and means for transferring energy from either of said last two circuits to the other to offset changes of current in the regulating coil.

5. The combination with a working circuit of a main generator and compensatory circuit in parallel to each other with relation to the working circuit, a regulating coil for such compensatory circuit located in the generator circuit, and means for offsetting the effects upon the generator of changes of current in the regulating coil.

6. The combination with a working circuit of a main generator and compensatory circuit in parallel with relation thereto, a regulating coil, transforming apparatus controlled thereby and controlling the action of said compensatory circuit, and connections from said transforming apparatus to the circuits at opposite sides of said regulating coil.

7. The combination with a working circuit of a main generator and compensatory circuit in parallel to each other with relation to the working circuit, a regulating coil for such compensatory circuit located in the generator circuit, and means including transforming apparatus for offsetting the effects upon the generator of changes of current in the regulating coil, said transforming apparatus and regulating coil having such characteristics that the former transfers a current from or to the generator substantially equal to the decrease or increase respectively of current in the regulating coil.

8. The combination with the main generator and generator circuit, the storage battery and booster in parallel therewith and the working circuit, of transforming apparatus adapted to regulate the booster voltage, and a regulating coil for said transforming apparatus located in the generator circuit and between the opposite ends of the transforming apparatus.

9. The combination with a working circuit of a main generator and compensatory circuit in parallel to each other with relation to the working circuit, a regulating coil for such compensatory circuit located in the generator circuit, and means including transforming apparatus for offsetting the effects upon the generator of changes of current in the regulating coil, said transforming apparatus and regulating coil having such characteristics that the former transfers a current from or to assist the generator substantially equal to the decrease or increase respectively of current in the regulating coil, the transforming apparatus offsetting changes of current in the regulating coil.

10. The combination with a working circuit of a main generator and compensatory circuit in parallel to each other with relation to the working circuit, a regulating coil for such compensatory circuit located in the generator circuit, and means including transforming apparatus for offsetting the effects upon the generator of changes of current in the regulating coil, said transforming apparatus and regulating coil having such characteristics that the former transfers a current from or to assist the generator substantially equal to the decrease or increase respectively of current in the regulating coil, the transforming apparatus supplying current to supplement the generator when the current rises in the regulating coil and vice versa.

11. The combination with the main generator and generator circuit, the storage battery and booster in parallel therewith, and the working circuit, of a field-coil for said booster, a circuit containing said field-coil in parallel with the generator, means for generating or consuming current in said circuit, and a regulating coil for said field-circuit located between the point of connection of the generator and booster-field circuits and the point of connection of the generator and working circuits.

12. The combination of a main generator, a compensatory battery and booster in parallel therewith, a field coil for said booster and a regulating dynamo in series therewith, a field-coil for said dynamo located in the generator circuit, a connection between the booster field-coil circuit and the generator circuit between the field-coil of the regulating dynamo and the main generator, and a motor mechanically connected to the said regulating dynamo and electrically connected to the system beyond the field-coil of the regulating dynamo.

In testimony whereof, I have signed my name to this specification, in the presence of two subscribing witnesses.

ALBERT S. HUBBARD.

Witnesses:
 EDWIN SEGER,
 JOHN O. GEMPLER.